US011254222B2

United States Patent
Stirban et al.

(10) Patent No.: US 11,254,222 B2
(45) Date of Patent: Feb. 22, 2022

(54) METHOD FOR OPERATING A DRIVE SYSTEM OF AN ELECTRIC VEHICLE AND DRIVE SYSTEM FOR AN ELECTRIC VEHICLE

(71) Applicant: Robert Bosch GmbH, Stuttgart (DE)

(72) Inventors: Alin Stirban, Boeblingen (DE); Taleb Janbein, Sindelfingen (DE); Tobias Illg, Eppingen (DE)

(73) Assignee: Robert Bosch GmbH, Stuttgart (DE)

( * ) Notice: Subject to any disclaimer, the term of this patent is extended or adjusted under 35 U.S.C. 154(b) by 78 days.

(21) Appl. No.: 16/840,863

(22) Filed: Apr. 6, 2020

(65) Prior Publication Data

US 2020/0324657 A1 Oct. 15, 2020

(30) Foreign Application Priority Data

Apr. 11, 2019 (DE) ...................... 10 2019 205 218.5

(51) Int. Cl.
*B60L 50/61* (2019.01)
*B60L 15/20* (2006.01)
*B60K 1/04* (2019.01)

(52) U.S. Cl.
CPC ................ *B60L 50/61* (2019.02); *B60K 1/04* (2013.01); *B60L 15/20* (2013.01)

(58) Field of Classification Search
CPC ............ B60L 50/61; B60L 15/20; B60K 1/04
See application file for complete search history.

(56) References Cited

U.S. PATENT DOCUMENTS

| | | | |
|---|---|---|---|
| 5,347,680 A * | 9/1994 | Rippe | B60B 33/0042 16/18 R |
| 6,202,776 B1 * | 3/2001 | Masberg | F02N 11/0818 180/65.22 |
| 6,357,077 B1 * | 3/2002 | Jones, Jr. | B60B 33/045 16/35 D |
| 2007/0080512 A1 * | 4/2007 | Bartholmey | B62B 1/14 280/47.24 |
| 2009/0212626 A1 * | 8/2009 | Snyder | B60L 50/61 307/10.1 |
| 2013/0049684 A1 * | 2/2013 | Kusch | B60L 50/16 320/109 |
| 2013/0307489 A1 * | 11/2013 | Kusch | B60L 15/007 320/162 |
| 2018/0236877 A1 * | 8/2018 | Ge | B60L 50/16 |

FOREIGN PATENT DOCUMENTS

| | | | | |
|---|---|---|---|---|
| DE | 102016201212 A1 | * | 7/2017 | ............ B60Q 9/00 |
| WO | WO-2010015322 A1 | * | 2/2010 | ............ H02M 7/493 |

\* cited by examiner

*Primary Examiner* — James A Shriver, II
*Assistant Examiner* — Michael T. Walsh
(74) *Attorney, Agent, or Firm* — Michael Best & Friedrich LLP

(57) ABSTRACT

A method for operating a drive system (10) of an electric vehicle, comprising a first energy source (21), a second energy source (22) formed as an electrical energy store, and at least one electric machine (30) is disclosed. In a first operating mode, electrical energy is transferred from the first energy source (21) to at least one electric machine (30), and electrical energy is transferred from the second energy source (22) to at least one electric machine (30). In a second operating mode, electrical energy is transferred from the first energy source (21) to at least one electric machine (30), and electrical energy is transferred from at least one electric machine (30) to the second energy source (22).

12 Claims, 2 Drawing Sheets

METHOD FOR OPERATING A DRIVE SYSTEM OF AN ELECTRIC VEHICLE AND DRIVE SYSTEM FOR AN ELECTRIC VEHICLE

BACKGROUND OF THE INVENTION

The invention relates to a method for operating a drive system of an electric vehicle, which comprises a first energy source, a second energy source formed as an electrical energy store, and at least one electric machine. The invention also relates to a drive system for an electric vehicle, comprising a first energy source, a second energy source formed as an electrical energy store, and at least one electric machine, wherein electrical energy can be transferred from the first energy source to at least one electric machine, and electrical energy can be transferred from the second energy source to at least one electric machine, and electrical energy can be transferred from at least one electric machine to the second energy source.

It is becoming apparent that, in the future, use will increasingly be made of electric vehicles which have drive units with an electric machine or a multiplicity of electric machines to drive the electric vehicle. Electric machines for driving electric vehicles are generally three-phase or multi-phase and are driven by inverters.

Such electric vehicles additionally have an electrical energy source or multiple electrical energy sources for supplying the electric machines with electrical energy. Such an electrical energy source is formed, for example, as an electrical energy store and has multiple battery cells, which are wired in series and/or in parallel with one another. Suitable in particular for such applications are lithium ion battery cells. These are distinguished, inter-alia, by high energy densities, thermal stability and an extremely low self-discharge. Such an electrical energy store can, for example, be charged with electrical energy at an external charging station. To drive the electric vehicle, the electrical energy store then discharges electrical energy to the electric machines.

When the electric vehicle is accelerated, the electric machines therefore draw electrical energy from the electrical energy store. When the electric vehicle is braked, the electric machines act as generators and feed generated recuperation energy back into the electrical energy store. If multiple electrical energy stores are provided, then the individual electrical energy stores can have different states of charge (SoC). For optimal operation of the drive system, the states have charge of the individual electrical energy stores should remain at least approximately the same.

SUMMARY OF THE INVENTION

A method for operating a drive system of an electric vehicle is proposed. The drive system comprises a first energy source, a second energy source formed as an electrical energy store, and at least one electric machine for driving the electric vehicle. The second energy source is, for example, a lithium ion battery and has multiple battery cells, which are wired in series and/or in parallel with one another. The first energy source can likewise be a lithium ion battery. The first energy source does not necessarily have to be an electrical energy store but can also be, for example, a fuel cell or overhead line.

According to the invention, a first operating mode is provided, in which electrical energy is transferred from the first energy source to at least one electric machine of the drive system, and in which electrical energy is transferred from the second energy source to at least one electric machine of the drive system. In the first operating mode, the first energy source and the second energy source therefore supply electrical energy to drive the electric vehicle. The first energy source and the second energy source are discharged in the process.

Furthermore, according to the invention, a second operating mode is provided, in which electrical energy is transferred from the first energy source to at least one electric machine of the drive system, and in which electrical energy is transferred from at least one electric machine of the drive system to the second energy source. In the second operating mode, the first energy source therefore supplies electrical energy to drive the electric vehicle, and the second energy source is charged with electrical energy.

According to an advantageous refinement of the invention, the drive system comprises a six-phase electric machine for driving the electric vehicle. In the first operating mode, electrical energy is transferred from the first energy source to the six-phase electric machine, and electrical energy is transferred from the second energy source to the six-phase electric machine. In the second operating mode, electrical energy is transferred from the first energy source to the six-phase electric machine, and electrical energy is transferred from the six-phase electric machine to the second energy source.

According to another advantageous refinement of the invention, the drive system comprises a first three-phase electric machine for driving the electric vehicle and a second three-phase electric machine for driving the electric vehicle. In the first operating mode, electrical energy is transferred from the first energy source to the first three-phase electric machine, and electrical energy is transferred from the second energy source to the second three-phase electric machine. In the second operating mode, electrical energy is transferred from the first energy source to the first three-phase electric machine, and electrical energy is transferred from the second three-phase electric machine to the second energy source.

According to an advantageous development of the invention, a third operating mode is additionally provided, in which electrical energy is transferred from the first energy source to at least one electric machine of the drive system, but in which no electrical energy is transferred between the second energy source and an electric machine of the drive system. In the third operating mode, therefore, the first energy source supplies electrical energy for driving the electric vehicle, while the second energy source is neither charged with electrical energy nor discharged.

Advantageously, in each case the operating mode of the drive system is chosen in which an overall efficiency is maximum. It has transpired that, as a rule, the overall efficiency of the drive system in the first operating mode is higher than in the second operating mode and higher than in the third operating mode. However, the first operating mode can be selected only when the second energy source has a sufficient quantity of electrical energy to drive the electric vehicle, i.e. is not empty.

According to a preferred refinement of the invention, the first operating mode is therefore selected when a state of charge of the second energy source exceeds a first threshold value. If the state of charge of the second energy source exceeds the first threshold value, then the second energy source has a sufficient quantity of electrical energy to drive the electric vehicle. The first threshold value is, for example, 20% of the maximum state of charge of the second energy source.

It has further transpired that, as a rule, the overall efficiency of the drive system in the second operating mode is higher than in the third operating mode. The second operating mode can also be selected when the second energy source does not have a sufficient quantity of electrical energy to drive the electric vehicle, i.e. is approximately empty.

According to a preferred refinement of the invention, the second operating mode is therefore selected when a state of charge of the second energy source falls below a second threshold value. When the state of charge of the second energy source falls below the second threshold value, then the second energy source is approximately empty. The second threshold value is, for example, 20% of the maximum state of charge of the second energy source.

The first threshold value can be equal to the second threshold value. The first threshold value and the second threshold value can also be different. For example, the first threshold value can be higher than the second threshold value. When the state of charge of the second energy source lies between the first threshold value and the second threshold value, then, for example, the first operating mode, the second operating mode or the third operating mode can be selected.

Preferably, in the second operating mode, a charging power is predefined as a function of a rotational speed and/or a torque of the electric machine to which electrical energy is transferred from the first energy source. The charging power corresponds to a quantity of electrical energy which is transferred from an electric machine to the second energy source in a specific time period.

The charging power is preferably predefined in such a way that the overall efficiency of the drive system in the second operating mode is maximized. The respective charging power to be predefined can, for example, be taken from a static lookup table. The respective charging power to be predefined can, for example, also be calculated dynamically in real-time by a computing unit.

Also proposed is a drive system for an electric vehicle. The drive system comprises a first energy source, a second energy source formed as an electrical energy store, and at least one electric machine for driving the electric vehicle. The second energy source is, for example, a lithium ion battery and has multiple battery cells, which are wired in series and/or in parallel with one another. The first energy source can likewise be a lithium ion battery. The first energy source does not necessarily have to be an electrical energy store but, for example, can also be a fuel cell or an overhead line.

Electrical energy can be transferred from the first energy source to at least one electric machine. In addition, electrical energy can be transferred from the second energy source to at least one electric machine. Furthermore, electrical energy can be transferred from at least one electric machine to the second energy source. The drive system is set up to carry out the method according to the invention.

According to an advantageous refinement of the invention, the drive system comprises a six-phase electric machine for driving the electric vehicle. Electrical energy is transferred from the first energy source to the six-phase electric machine. Electrical energy can also be transferred from the second energy source to the six-phase electric machine. Furthermore, electrical energy can be transferred from the six-phase electric machine to the second energy source.

According to another advantageous refinement of the invention, the drive system comprises a first three-phase electric machine for driving the electric vehicle and a second three-phase electric machine for driving the electric vehicle. Electrical energy can be transferred from the first energy source to the first three-phase electric machine. Electrical energy can also be transferred from the second energy source to the second three-phase electric machine. Furthermore, electrical energy can be transferred from the second three-phase electric machine to the second energy source.

According to a preferred refinement of the invention, a selection unit is provided which selects an operating mode as a function of the state of charge of the second energy source. Preferably, the selection unit selects the first operating mode when the state of charge of the second energy source exceeds the first threshold value, when the second energy source therefore has a sufficient quantity of electrical energy to drive the electric vehicle. Preferably, the selection unit selects the second operating mode when the state of charge of the second energy source falls below the second threshold value, when the second energy source therefore does not have a sufficient quantity of electrical energy to drive the electric vehicle, i.e. is approximately empty.

Preferably, the selection unit predefines a charging power in the second operating mode as a function of a rotational speed and/or a torque of the electric machine to which electrical energy is transferred from the second energy source. The charging power corresponds to a quantity of electrical energy which is transferred from an electric machine to the second energy source in a specific time period.

The selection unit preferably predefines the charging power in such a way that the overall efficiency of the drive system in the second operating mode is maximized. For this purpose, the selection unit comprises, for example, a static lookup table, from which the respective charging power to be predefined can be taken. The selection unit can also, for example, have a computing unit, which calculates the respective charging power to be predefined in real time.

The method according to the invention permits an approximately empty energy source which is formed as an electrical energy store to be charged again during the travel of an electric vehicle. The transference of the electrical energy for charging the energy store takes place via one or more electric machines, which are provided to drive the electric vehicle. Additional hardware is not required. Advantageously, at any operating point of the electric machines, that operating mode can be selected in which the overall efficiency of the drive system is maximum, which means that losses in the drive system are minimized. The method can be used, for example, in a drive system with a six-phase or multi-phase electric machine and in a drive system with two three-phase electric machines. Likewise, the method can also be carried out with at least two multi-phase machines and at least two energy sources.

BRIEF DESCRIPTION OF THE DRAWINGS

Embodiments of the invention will be explained in more detail by using the drawings and the following description.

In the drawings.

BRIEF DESCRIPTION OF THE DRAWINGS

In the following description of the embodiments of the invention, same or similar elements are designated by the same designations, repeated description of these elements being omitted in individual cases. The figures represent the subject matter of the invention only schematically.

Figure 1:
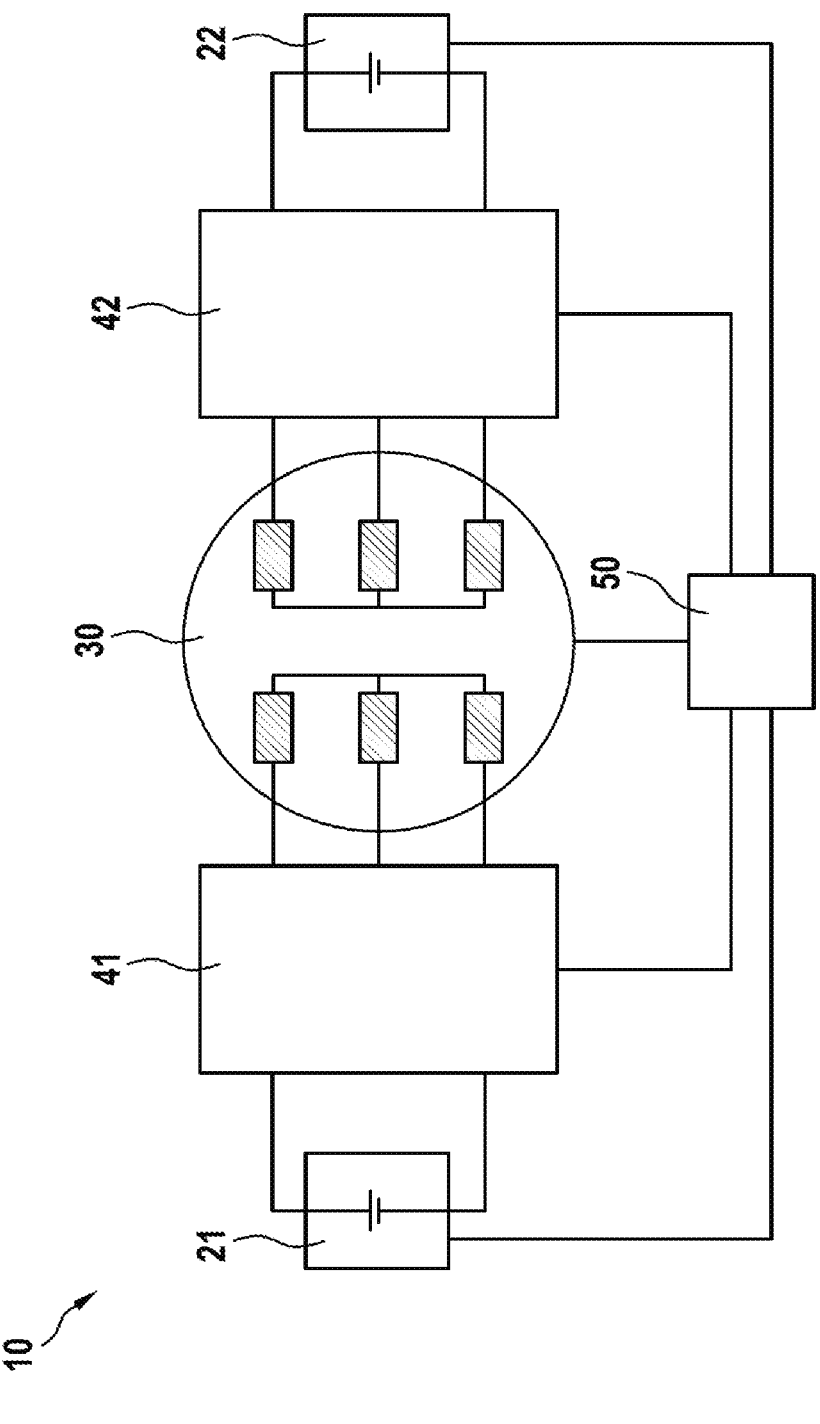
FIG. 1 shows a schematic representation of a drive system according to a first embodiment for an electric vehicle and FIG. 2 shows a schematic representation of a drive system according to a second embodiment for an electric vehicle.

FIG. 1 shows a schematic representation of a drive system 10 according to a first embodiment for an electric vehicle. The drive system 10 comprises a first energy source 21 and a second energy source 22. In the present case, the first energy source 21 and the second energy source 22 are formed as electrical energy stores and each have multiple lithium ion battery cells, which are wired in series and/or in parallel with one another.

The drive system 10 comprises a six-phase electric machine 30 for driving the electric vehicle. The drive system 10 also comprises a first power electronics unit 41. The first power electronics unit 41 is used to drive three phases of the six-phase electric machine 30. The drive system 10 further comprises a second power electronics unit 42. The second power electronics unit 42 is used to drive three further phases of the six-phase electric machine 30.

The first power electronics unit 41 is connected electrically to three phases of the six-phase electric machine 30 by means of three phase conductors. The first power electronics unit 41 is connected to the first energy source 21 by means of two DC voltage conductors. The first power electronics unit 41 comprises a three-phase inverter, which generates a three-phase AC voltage for driving the six-phase electric machine 30 from the DC voltage supplied from the first energy source 21.

The second power electronics unit 42 is connected electrically to three phases of the six-phase electric machine 30 by means of three phase conductors. The second power electronics unit 42 is connected to the second energy source 22 by means of two DC voltage conductors. The second power electronics unit 42 comprises a three-phase inverter, which generates a three-phase AC voltage for driving the six-phase electric machine 30 from the DC voltage supplied from the second energy source 22.

The drive system 10 comprises a selection unit 50. The selection unit 50 selects an operating mode as a function of a state of charge of the second energy source 22. In the second operating mode, the selection unit 50 predefines a charging power for the second energy source 22 as a function of a rotational speed and/or a torque of the six-phase electric machine 30.

Via appropriate signal lines, the selection unit 50 receives in particular the state of charge of the first energy source 21, the state of charge of the second energy source 22 and rotational speed and torque of the six-phase electric machine 30. The selection unit 50 controls the first power electronics unit 41 and the second power electronics unit 42 via control lines in accordance with the selected operating mode.

In the first operating mode, electrical energy is transferred from the first energy source 21 via the first power electronics unit 41 to the six-phase electric machine 30. In addition, electrical energy is transferred from the second energy source 22 via the second power electronics unit 42 to the six-phase electric machine 30.

In the second operating mode, electrical energy is transferred from the first energy source 21 via the first power electronics unit 41 to the six-phase electric machine 30. In the process, a three-phase voltage is induced in the six-phase electric machine 30. This three-phase voltage is rectified in the second power electronics unit 42. Thus, electrical energy is transferred from the six-phase electric machine 30 via the second power electronics unit 42 to the second energy source 22.

Figure 2:
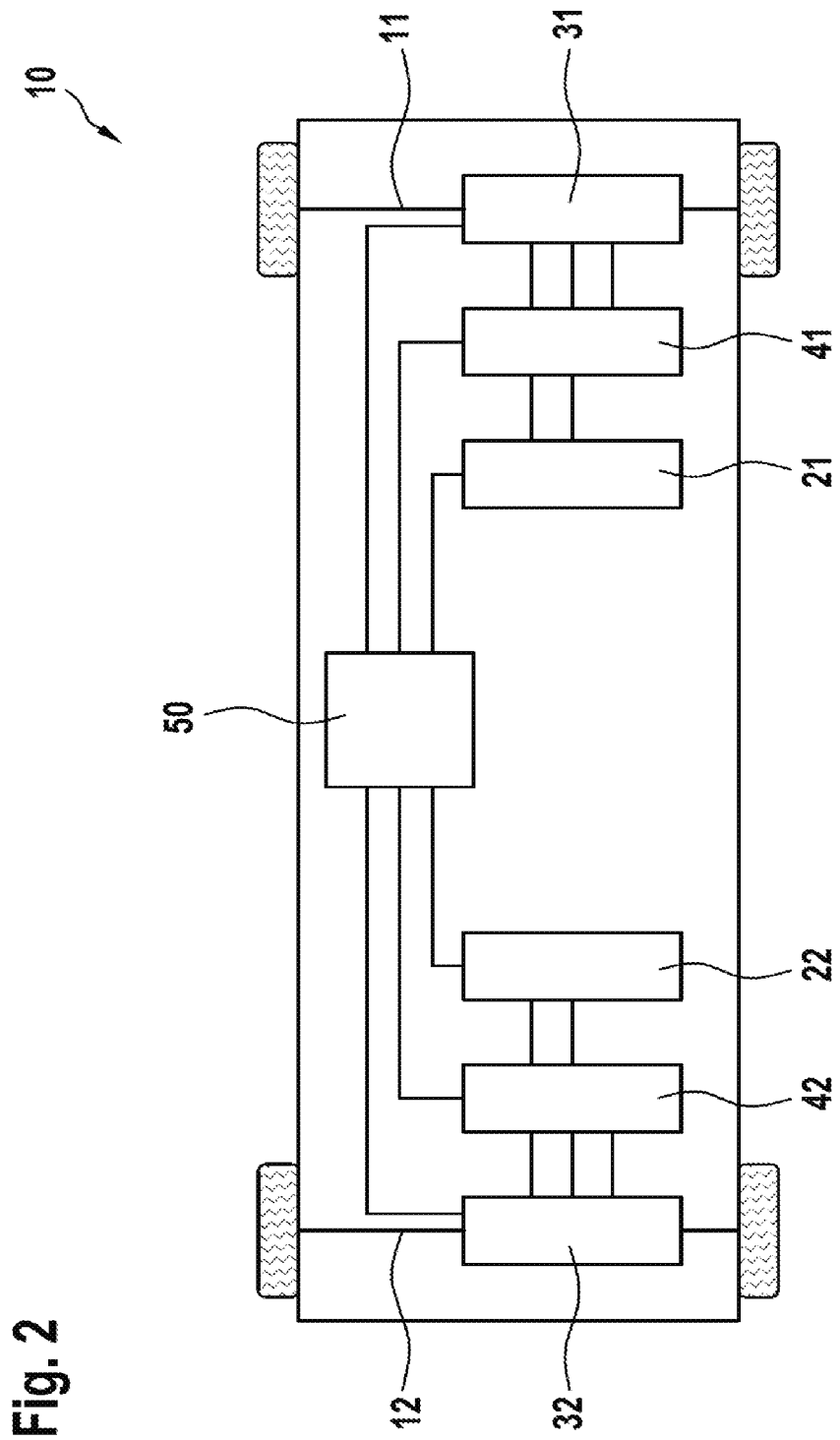

FIG. 2 shows a schematic representation of a drive system 10 according to a second embodiment for an electric vehicle. The drive system 10 comprises a first energy source 21 and a second energy source 22. In the present case, the first energy source 21 and the second energy source 22 are formed as electrical energy stores and each have multiple lithium ion battery cells, which are wired in series and/or in parallel with one another.

The drive system 10 comprises a first three-phase electric machine 31 for driving the electric vehicle. In the present case, the first three-phase electric machine 31 drives a front axle 11 of the electric vehicle. The drive system 10 also comprises a first power electronics unit 41. The first power electronics unit 41 is used to drive the first three-phase electric machine 31.

For this purpose, the first power electronics unit 41 is connected electrically to the first three-phase electric machine 31 by means of three phase conductors. The first power electronics unit 41 is connected to the first energy source 21 by means of two DC voltage conductors. The first power electronics unit 41 comprises a three-phase inverter, which generates a three-phase AC voltage for driving the first three-phase electric machine 31 from the DC voltage supplied from the first energy source 21.

The drive system 10 comprises a second three-phase electric machine 32 for driving the electric vehicle. In the present case, the second three-phase electric machine 32 drives a rear axle 12 of the electric vehicle. The drive system 10 further comprises a second power electronics unit 42. The second power electronics unit 42 is used to drive the second three-phase electric machine 32.

For this purpose, the second power electronics unit 42 is connected electrically to the second three-phase electric machine 32 by means of three phase conductors. The second power electronics unit 42 is connected to the second energy source 22 by means of two DC voltage conductors. The second power electronics unit 42 comprises a three-phase inverter, which generates a three-phase AC voltage for driving the second three-phase electric machine 32 from the DC voltage supplied from the second energy source 22.

The drive system 10 comprises a selection unit 50. The selection unit 50 selects an operating mode as a function of a state of charge of the second energy source 22. In the second operating mode, the selection unit 50 predefines a charging power for the second energy source 22 as a function of a rotational speed and/or a torque of the first three-phase electric machine 31.

The selection unit 50 receives via appropriate signal lines in particular the state of charge of the first energy source 21, the state of charge of the second energy source 22 and rotational speed and torque of the first three-phase electric machine 31 and the second three-phase electric machine 32. The selection unit 50 controls the first power electronics unit 41 and the second power electronics unit 42 via control lines in accordance with the selected operating mode.

In the first operating mode, electrical energy is transferred from the first energy source 21 via the first power electronics unit 41 to the first three-phase electric machine 31. In addition, electrical energy is transferred from the second energy source 22 via the second power electronics unit 42 to the second three-phase electric machine 32.

In the second operating mode, electrical energy is transferred from the first energy source 21 via the first power electronics unit 41 to the first three-phase electric machine 31. The first three-phase electric machine 31 drives the front axle 11 of the electric vehicle. The rear axle 12 of the electric vehicle drives the second three-phase electric machine 32, which acts as a generator and induces a three-phase voltage. This three-phase voltage is rectified in the second power electronics unit 42. Thus, electrical energy is transferred from the second three-phase electric machine 32 via the second power electronics unit 42 to the second energy source 22.

The invention is not restricted to the exemplary embodiments described here and the aspects emphasized therein. Instead, within the scope indicated by the claims, a multiplicity of modifications which lie within the scope of professional practice are possible.

The invention claimed is:

1. A method for operating a drive system (10) of an electric vehicle, the drive system comprising
   a first energy source (21), a second energy source (22) formed as an electrical energy store, and at least one electric machine (30, 31, 32),
   the method comprising
   in a first operating mode, transferring electrical energy from the first energy source (21) to at least one electric machine (30, 31, 32), and transferring electrical energy from the second energy source (22) to at least one electric machine (30, 31, 32), and
   in a second operating mode, transferring electrical energy from the first energy source (21) to at least one electric machine (30, 31, 32), and transferring electrical energy from at least one electric machine (30, 31, 32) to the second energy source (22), wherein the second energy source (22) is charged with the transferred electrical energy of at least one electric machine (30, 31, 32) while the first energy source supplies the electrical energy to a drive system (10) of an electric vehicle.

2. The method according to claim 1, wherein
   the drive system (10) comprises a six-phase electric machine (30), wherein
   in the first operating mode, electrical energy is transferred from the first energy source (21) to the six-phase electric machine (30), and electrical energy is transferred from the second energy source (22) to the six-phase electric machine (30), and in that
   in the second operating mode, electrical energy is transferred from the first energy source (21) to the six-phase electric machine (30), and electrical energy is transferred from the six-phase electric machine (30) to the second energy source (22).

3. The method according to claim 1, wherein
   the drive system (10) comprises a first three-phase electric machine (31) and a second three-phase electric machine (32),
   in the first operating mode, electrical energy is transferred from the first energy source (21) to the first three-phase electric machine (31), and electrical energy is transferred from the second energy source (22) to the second three-phase electric machine (32), and
   in the second operating mode, electrical energy is transferred from the first energy source (21) to the first three-phase electric machine (31), and electrical energy is transferred from the second three-phase electric machine (32) to the second energy source (22).

4. The method according to claim 1, wherein
   in a third operating mode, electrical energy is transferred from the first energy source (21) to at least one electric machine (30, 31, 32), and no electrical energy is transferred between the second energy source (22) and an electric machine (30, 31, 32).

5. The method according to claim 1, wherein
   the first operating mode is selected when a state of charge of the second energy source (22) exceeds a first threshold value.

6. The method according to claim 1, wherein
   the second operating mode is selected when a state of charge of the second energy source (22) falls below a second threshold value.

7. The method according to claim 6, wherein in the second operating mode, a charging power is defined as a function of a rotational speed, a torque, or both a rotational speed and a torque of the electric machine (30, 31, 32) to which electrical energy is transferred from the first energy source (21).

8. A drive system (10) for an electric vehicle, the drive system comprising
   a first energy source (21), a second energy source (22) formed as an electrical energy store, and at least one electric machine (30, 31, 32),
   wherein the drive system is configured to transfer electrical energy from the first energy source (21) to at least one electric machine (30, 31, 32), and to transfer electrical energy from the second energy source (22) to at least one electric machine (30, 31, 32), and to transfer electrical energy from at least one electric machine (30, 31, 32) to the second energy source (22), wherein the second energy source (22) is charged with the transferred electrical energy of at least one electric machine (30, 31, 32) while the first energy source supplies the electrical energy to a drive system (10) of an electric vehicle.

9. The drive system (10) according to claim 8, wherein the drive system (10) comprises a six-phase electric machine (30), wherein electrical energy can be transferred from the first energy source (21) to the six-phase electric machine (30), and electrical energy can be transferred from the second energy source (22) to the six-phase electric machine (30), and electrical energy can be transferred from the six-phase electric machine (30) to the second energy source (22).

10. The drive system (10) according to claim 8, wherein the drive system (10) comprises a first three-phase electric machine (31) and a second three-phase electric machine (32), wherein
    electrical energy can be transferred from the second energy source 22 to the first three-phase electric machine (31), and electrical energy can be transferred from the second energy source (22) to the second three-phase electric machine (32), and electrical energy can be transferred from the second three-phase electric machine (32) to the second energy source (22).

11. The drive system (10) according to claim 8, wherein a selection unit (50) is provided, which selects an operating mode as a function of a state of charge of the second energy source (22).

12. The drive system (10) according to claim 11, wherein the selection unit (50) predefines a charging power in the second operating mode as a function of a rotational speed, a torque, or both rotational speed and a torque of the electric machine (30, 31, 32) to which electrical energy is transferred from the first energy source (21).

* * * * *